US012632851B2

(12) United States Patent
Das et al.

(10) Patent No.: US 12,632,851 B2
(45) Date of Patent: May 19, 2026

(54) INTERCHANGE PRICING FOR FINANCIAL TRANSACTIONS

(71) Applicant: Mastercard International Incorporated, Purchase, NY (US)

(72) Inventors: Rahul Das Putham Das, Arlington, VA (US); Alexandra Dudkina, Prague (CZ)

(73) Assignee: MASTERCARD INTERNATIONAL INCORPORATED, New York, NY (US)

( * ) Notice: Subject to any disclaimer, the term of this patent is extended or adjusted under 35 U.S.C. 154(b) by 71 days.

(21) Appl. No.: 18/666,688

(22) Filed: May 16, 2024

(65) Prior Publication Data

US 2025/0356339 A1     Nov. 20, 2025

(51) Int. Cl.
G06Q 30/00          (2023.01)
G06Q 20/34          (2012.01)

(52) U.S. Cl.
CPC .................................... G06Q 20/34 (2013.01)

(58) Field of Classification Search
CPC .................................................... G06Q 20/34
USPC .......... 705/39, 1.1, 44, 35, 14.1, 329, 14.27; 379/93.02
See application file for complete search history.

(56) References Cited

U.S. PATENT DOCUMENTS

| | | | |
|---|---|---|---|
| 7,624,068 B1 | 11/2009 | Heasley et al. | |
| 10,346,731 B2 | 7/2019 | Nambair et al. | |
| 11,763,336 B2 * | 9/2023 | Tietzen | G06Q 30/0226 705/14.27 |
| 2013/0159151 A1 | 6/2013 | Mcelroy | |
| 2015/0221028 A1 | 8/2015 | White et al. | |
| 2023/0214794 A1 * | 7/2023 | Gupta | G06Q 20/027 705/44 |

OTHER PUBLICATIONS ip.com NPL Search History.*

* cited by examiner

*Primary Examiner* — John H. Holly
(74) *Attorney, Agent, or Firm* — Grant Attorneys at Law PLLC; Kristin Grant

(57)          ABSTRACT

A method of processing financial transactions is provided for determining tailored interchange prices for individual financial transactions. Financial data from a plurality of financial transactions is collected and segregated among different attributes. The attributes may include attribute types like transaction attributes, merchant attributes, issuer attributes and user attributes. The attributes may also include fixed and dynamic attributes for each attribute type. Attribute values are then determined for each attribute of each financial transaction. An interchange price is then determined for each financial transaction using a plurality of attribute values for the particular financial transaction.

19 Claims, 2 Drawing Sheets

INTERCHANGE PRICING FOR FINANCIAL TRANSACTIONS

BACKGROUND

The present inventions relate generally to financial transaction processing, and more particularly, to interchange pricing of financial transactions.

Modern consumer payment systems commonly utilize sophisticated transaction systems involving one bank associated with the consumer (issuer), another bank associated with the merchant (acquirer) and a transaction processor (e.g., Mastercard) that facilitates payments from the consumer bank to the merchant bank. One way in which the costs of such systems are covered is through the use of interchange fees. Interchange fees are charged to the merchant when a consumer makes a purchase at the merchant with a credit card or similar form of payment. The interchange fees are then paid to various entities involved in the payment system like the card issuer (the consumer's bank) and the transaction processor.

Although the use of interchange fees as a means to cover the costs of the various entities involved in modern consumer payment systems has allowed such payment systems to become widely used, well-known and quite efficient, current interchange pricing systems can be complicated and inefficient. One problem with current interchange pricing is that the pricing rates are generally static over periods of time. Current interchange pricing also considers a limited number of factors to determine pricing rates. Thus, merchants, card issuers and transaction processors have limited incentives and opportunities to influence financial transaction costs in such systems. Thus, it is believed that an improved system for determining interchange pricing for financial transactions would be desirable.

SUMMARY

A method of processing financial transactions is described. Financial transaction data is collected from many financial transactions and is segregated into attribute types and fixed and variable attributes. A plurality of attribute values is determined for each of the financial transactions using the financial transaction data as segregated into the various attributes. An interchange price is then determined for each financial transaction using the plurality of attribute values for each financial transaction. The invention may also include any other aspect described below in the written description or in the attached drawings and any combinations thereof.

BRIEF DESCRIPTION OF SEVERAL VIEWS OF THE DRAWINGS

The invention may be more fully understood by reading the following description in conjunction with the drawing, in which.

DETAILED DESCRIPTION

Figure 1:
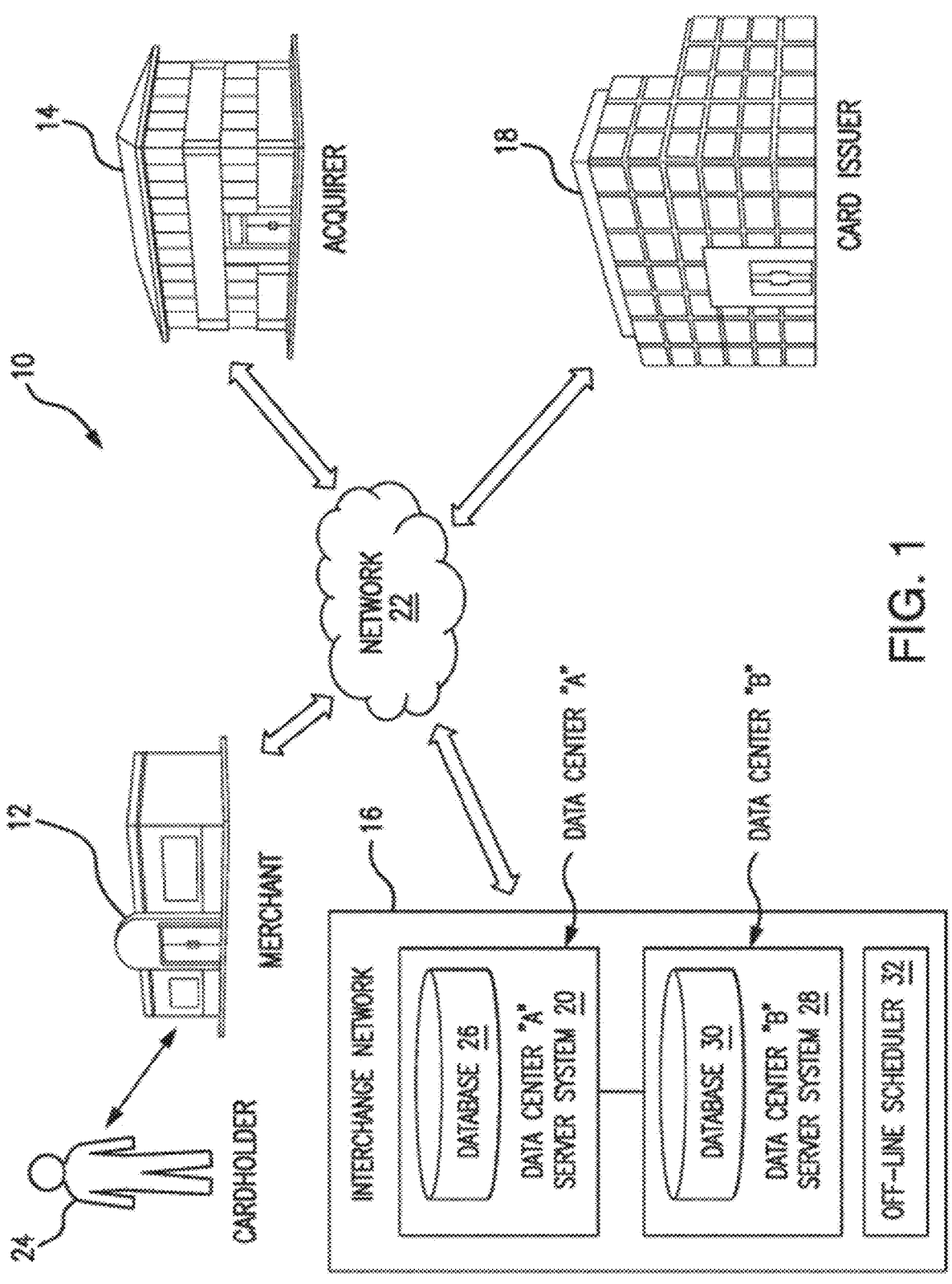
FIG. 1 is a block diagram of an example multi-party payment card network system, including a first and second data center and an off-line scheduler, in accordance with one embodiment of the disclosure.

FIG. 1 is a block diagram of an example multi-party payment card network system 10, including a data center A, a data center B, and an off-line scheduler 32. The payment card network system 10 facilitates providing interchange network services offered by an interchange network 16. In addition, the payment card network system 10 enables payment card transactions in which merchants 12, acquirers 14, and/or card issuers 18 do not need to have a one-to-one relationship. Although parts of the payment card network system 10 are presented in one arrangement, other embodiments may include the same or different parts arranged otherwise, depending, for example, on authorization processes for purchase transactions, communication between computing devices, etc.

In the example embodiment, the payment card network system 10 generally includes the merchants 12, the acquirers 14, the interchange network 16, and the issuers 18 coupled in communication via a network 22. The network 22 includes, for example and without limitation, one or more of a local area network (LAN), a wide area network (WAN) (e.g., the Internet, etc.), a mobile network, a virtual network, and/or any other suitable public and/or private network capable of facilitating communication among the merchants 12, the acquirers 14, the interchange network 16, and/or the issuers 18. In some embodiments, the network 22 may include more than one type of network, such as a private payment transaction network provided by the interchange network 16 to the acquirers 14 and/or the issuers 18, and separately, the public Internet, which may facilitate communication between the merchants 12, the interchange network 16, the acquirers 14, and/or cardholders 24.

Embodiments described herein may relate to a transaction card system, such as a credit card payment system using the Mastercard® interchange network. (Mastercard is a registered trademark of Mastercard International Incorporated). The Mastercard interchange network is a set of proprietary communications standards promulgated by Mastercard for the exchange of financial transaction data and the settlement of funds between financial institutions that are members of Mastercard. As used herein, financial transaction data includes a unique account number associated with an account holder using a payment card issued by an issuer, purchase data representing a purchase made by the cardholder, including a type of merchant, amount of purchase, date of purchase, and other data, which may be transmitted between any parties of multi-party payment card network system 10.

In a typical transaction card system, a financial institution called the "issuer" issues a transaction card, such as a credit card, to a cardholder or consumer 24, who uses the transaction card to tender payment for a purchase from the merchant 12. In the example embodiment, the merchant 12 is typically associated with products, for example, and without limitation, goods and/or services, that are offered for sale and are sold to the cardholders 24. The merchant 12 includes, for example, a physical location and/or a virtual location. A physical location includes, for example, a brick-and-mortar store, etc., and a virtual location includes, for example, an Internet-based store-front.

To accept payment with the transaction card, the merchant 12 must normally establish an account with a financial institution that is part of the payment card network system 10. This financial institution is usually called the "merchant bank," the "acquiring bank," or the acquirer 14. When the cardholder 24 provides payment for a purchase with a transaction card, the merchant 12 requests authorization from the acquirer 14 for the purchase amount. The request may be performed over the telephone but is usually performed using a point-of-sale terminal that reads the cardholder's account information from a magnetic stripe, a chip, or embossed characters on the transaction card and communicates electronically with the transaction processing computers of the acquirer 14. Alternatively, the acquirer 14 may authorize a third party to perform transaction processing on its behalf. In this case, the point-of-sale terminal will be configured to communicate with the third party. Such a third party is usually called a "merchant processor," an "acquiring processor," or a "third party processor."

Using the interchange network 16, computers of the acquirer 14 or merchant processor will communicate with computers of the issuer 18 to determine whether the cardholder's account is in good standing and whether the purchase transaction is covered by the cardholder's available credit line. Based on these determinations, the request for authorization will be declined or accepted. If the request is accepted, an authorization code is issued to the merchant 12. Each of these transactions may be stored by the interchange network 16 in one or more tables (not shown) that make up one or more computer databases, such as databases 26 and 30. It is noted that the databases 26 and 30, described herein, may be database servers and may be discrete servers distributed remotely from one another.

When a request for authorization is accepted, the available credit line of the cardholder's account is decreased. Normally, a charge for a payment card transaction is not posted immediately to the cardholder's account because bankcard associations, such as Mastercard, have promulgated rules that do not allow the merchant 12 to charge, or "capture," a transaction until the purchased goods are shipped or the purchased services are delivered. However, with respect to at least some debit card transactions, a charge may be posted at the time of the transaction. When the merchant 12 ships or delivers the goods or services, the merchant 12 captures the transaction by, for example, appropriate data entry procedures on the point-of-sale terminal. This may include bundling of approved transactions daily for standard retail purchases. If the cardholder 24 cancels a transaction before it is captured, a "void" is generated. If the cardholder 24 returns goods after the transaction has been captured, a "credit" is generated. The interchange network 16 and/or the issuer 18 stores the transaction data, such as, and without limitation, payment account number (PAN), a type of merchant, a merchant identifier, a location where the transaction was completed, an amount of purchase, a merchant category code, a date and time of the transaction, products purchased and related descriptions or identifiers, etc., in a transaction database, such as the databases 26 and 30.

After a purchase has been made, a clearing process occurs to transfer additional transaction data related to the purchase among the parties to the transaction, such as the acquirer 14, the interchange network 16, and the issuer 18. More specifically, during and/or after the clearing process, additional data, such as a time of purchase, a merchant name, a type of merchant, purchase information, cardholder account information, a type of transaction, itinerary information, information regarding the purchased item and/or service, and/or other suitable information, is associated with a transaction and transmitted between parties to the transaction as transaction data, and may be stored by any of the parties to the transaction.

After a transaction is authorized and cleared, the transaction is settled among the merchant 12, the acquirer 14, and the issuer 18. Settlement refers to the transfer of financial data or funds among the merchant 12, the acquirer 14, and the issuer 18 related to the transaction. Usually, transactions are captured and accumulated into a "batch," which is settled as a group. More specifically, a transaction is typically settled between the issuer 18 and the interchange network 16, and then between the interchange network 16 and the acquirer 14, and then between the acquirer 14 and the merchant 12. It should be appreciated that more or less information related to transactions, as part of either authorization, clearing, and/or settling, may be included in the transaction data, and stored within the databases 26 and 30, at the merchant 12, the acquirer 14, the payment network 16, and/or the issuer 18. Further, transaction data, unrelated to a particular payment account, may be collected by a variety of techniques, and similarly stored within the databases 26 and 30.

In some embodiments, cardholders 24 involved in the transactions described herein are prompted to agree to legal terms associated with their payment accounts, for example, during enrollment in such payment accounts, etc. As such, the cardholder 24 may voluntarily agree to allow the merchants 12, the issuers 18, the interchange network 16, etc., to utilize data collected during enrollment and/or collected relating to processing the transactions, subsequently for one or more of the purposes described herein.

In the exemplary embodiment, the interchange network 16 includes a plurality of data centers, such as the data center A and the data center B (e.g., data centers for redundancy, data centers in distant geographical locations for network efficiency, etc.). Each data center includes a respective data center server system, such as data center A server system 20 and data center B server system 28. The server systems 20 and 28 include a plurality of applications that can be accessed by any of the merchants 12, the acquirers 14, the issuers 18, and/or the cardholders 24. The applications typically are accessed via one or more application programming interfaces (APIs).

APIs, as used herein, are how various separate services work together to deliver a solution. For example, and without limitation, in online banking, when the cardholder 24 logs in, usually the first thing the cardholder sees is his or her account balance. To deliver that solution, fundamentally two separate banking functions (or applications) work together (e.g., a login service and account balance service) to allow the cardholder 24 to see how much money he or she has in the account. How those two (2) services manage to work together is through an API. Example Mastercard APIs include, for example, Automatic Billing Updater (ABU), BIN Table Resource, MDES, Merchant Identifier, Cardless ATM, Mastercard Send, Masterpass, etc.

Referring back to FIG. 1, in the exemplary embodiment, the server systems 20 and 28 are configured to allow data, such as the transaction data, to be stored by a group of computers, and updated by one or more members of the group. While the interchange network 16 is illustrated as a single component in FIG. 1, it should be appreciated that the interchange network 16 may be a network of distributed computers or data centers, each coupled to the payment card network system 10, for example, via the network 22. For example, and without limitation, each of data centers A and B may be geographically remote from each other data center, or they may be housed in a single data center but be physically separate databases.

The off-line scheduler 32 is configured to determine a change window (e.g., a time period) for taking one or more of the plurality of applications associated with the server systems 20 and 28 off-line. In particular, the off-line scheduler 32 analyzes the applications to determine which of the one or more APIs map to the application. For each of the applications, the off-line scheduler 32 performs a failure analysis on the APIs that map to the application to determine whether any of the APIs are single point of failure (SPOF) APIs. Based on the API failure analysis, the off-line scheduler 32 assigns a priority level to the application. The off-line scheduler 32 analyzes the historical data corresponding to the volume of network traffic for the APIs. Based on the application priority level and the historical network traffic data, the off-line scheduler 32 determines a change window for taking each respective application off-line that will reduce a negative impact on the operations of, for example, the merchant 12, acquirer 14, issuer 18, cardholder 24, etc.

While only one merchant 12, acquirer 14, interchange network 16, and issuer 18 are shown in FIG. 1 (for ease of reference), it should be appreciated that a variety of other embodiments may include multiple ones of these parties in various combinations.

In the preferred embodiments, interchange prices 20 may be determined dynamically such that interchange prices 20 may change with every transaction. Dynamic interchange prices 20 could therefore optimize interchange costs and lead to the creation of incentives for payment networks, issuers, acquirers, merchants and transacting users. For example, if a merchant receives high chargebacks, and as a result receives a high interchange rate 20, the merchant may have an incentive to lower its chargebacks which would lead to lower risks for all parties involved in the payment system. Improved incentives that are more aligned with associated costs may lead to greater security enhancements and innovation overall. Small and medium sized businesses that have lower transaction volumes which precludes them from having the negotiating power of larger merchants may also benefit from competitive interchange rates 20 without having to negotiate individual agreements. Market-based interchange pricing 20 is desirable since it promotes economic efficiency through resource allocation based on supply and demand. When interchange fees 20 are determined by market forces, they are more likely to reflect the actual costs and risks associated with processing financial transactions. Moreover, entities involved in processing financial transactions may benefit by making it easier for interchange prices 20 to be tailored to individual transactions at scale. This improvement may also lead to less time being expended on signing agreements and contracts with individual merchants and issuers.

Figure 2:
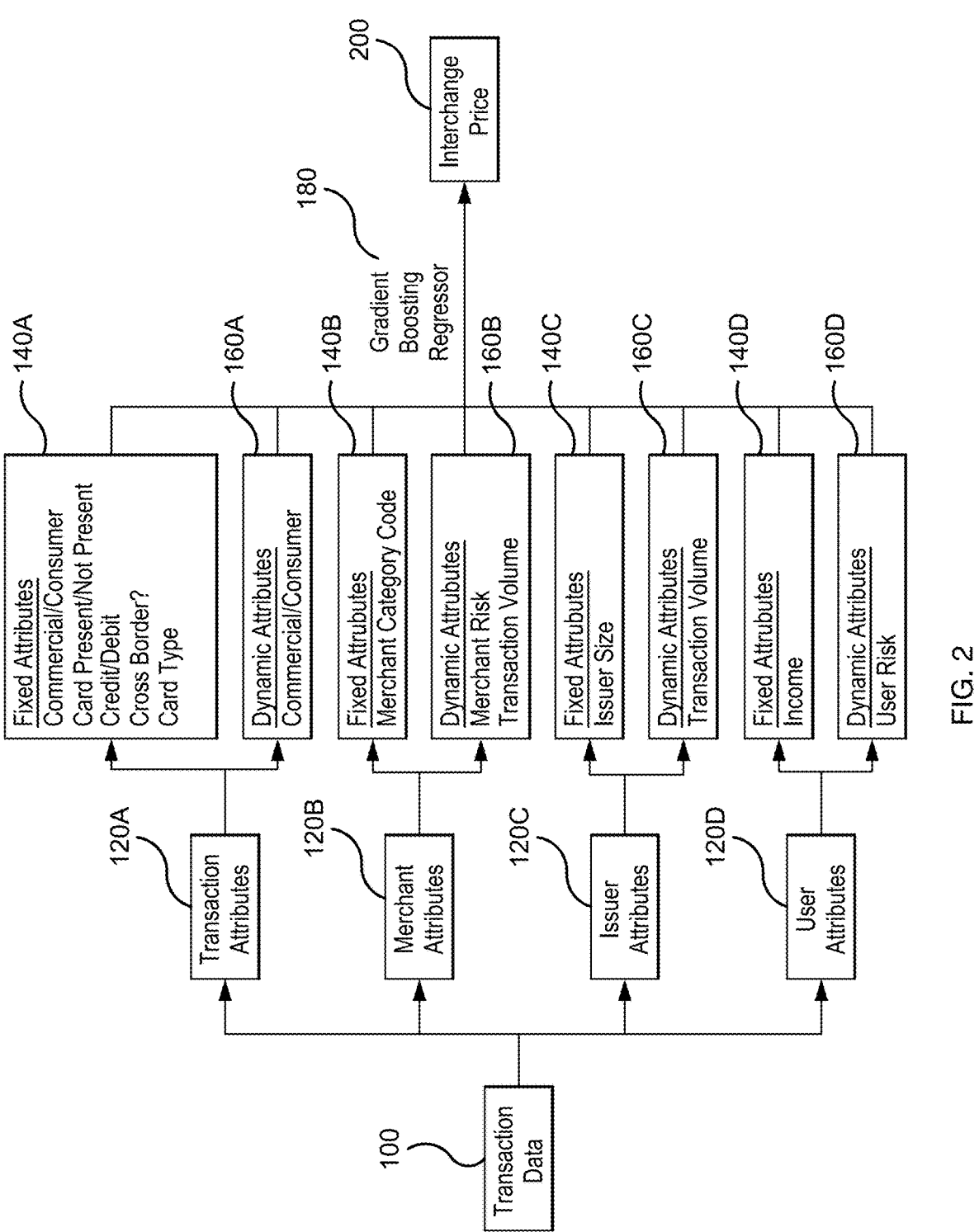
FIG. 2 illustrates a method of determining interchange prices for processing financial transactions.

Referring now to the FIG. 2, a method is shown for determining interchange prices 200 for financial transactions. In the method, financial transaction data 100 is collected for many financial transactions involving at least a plurality of different merchants and a plurality of different purchase transactions by a plurality of different consumers. The financial transactions may also include transactions involving different card issuers, etc. Typically, the financial transaction data 100 may be collected at the end of each day. As such, interchange pricing 200 for all financial transactions occurring during each day may be determined during the normal clearing phase using financial transaction data 100 obtained throughout the day during the authorization phase.

The financial transaction data 100 may then be segregated into different attribute types 120. In the preferred embodiment, the attribute types 120 may include transaction attributes 120A, merchant attributes 120B, issuer attributes 120C and user attributes 120D. The financial transaction data 100 that is segregated into different attribute types 120 may then be further segregated within each attribute type 120 into fixed attributes 140A-D and dynamic attributes 160A-D. The attributes 120, 140, 160 described herein are intended to be exemplary, and it is expected that many more attributes may be desirable. In one example, financial transaction data 100 related to merchant risk may be segregated into the merchant attribute type 120B and further segregated therein as a dynamic attribute 160B. Merchant risk typically refers to the potential financial loss that an issuer may suffer in the event that a merchant is unable to provide the funds that the issuer authorizes the cardholder. This can be computed by analyzing various factors such as fraud or chargeback rates associated with the merchant. Thus, each merchant can be assigned a risk score which affects the final interchange price 200. In another example, financial transaction data 100 related to transaction volumes may be segregated into different attribute types 120B-D depending on what the transaction volume is associated with. For example, each merchant may have a transaction volume associated with its own sales. An issuer may also have a transaction volume associated with transactions using financial cards issued to cardholders by the issuer. The consumer (user) may also have a transaction volume associated with transactions that have been initiated by the consumer. Within relevant attribute types 120, transaction volume may be further segregated into the dynamic attributes 160. In the case of a merchant, the interchange prices 200 will generally be lower as the transaction volume of the merchant increases. Thus, where interchange prices 200 vary depending on transaction volumes, merchants may be encouraged to use the payment system for more of their sales. In another example, financial transaction data 100 related to issuer size may be segregated into the issuer attribute type 120C. Because issuer size (e.g., number of cardholders) varies very little over short periods of time, data 100 related to issuer size may be segregated into the fixed attributes 140. In some localities, interchange prices 200 are regulated based on the size of the issuer. For example, in the United States, the Durbin Act mandates different interchange rates 200 for small and large banks. In another example, financial transaction data 100 related to user risk may be segregated into the user attribute type 120D and further segregated therein as a dynamic attribute 160D. User risk is similar to merchant risk. User risk typically refers to the potential that a cardholder will be unable to pay back the issuer based on the cardholder's historical data stored by the transaction processor.

Dynamic attributes 160 generally vary from day to day. In order to determine attribute values from financial transaction data 100 that has been segregated into dynamic attributes 160, the attribute values may be dynamically computed by ordering all of the data 100 that has been segregated into the particular dynamic attribute category 160 and then assigning values to each financial transaction based on the order of the financial transaction in the particular dynamic attribute category 160. Thus, for example, the financial transaction data 100 in a particular dynamic attribute category 160 may be plotted on a curve, and the attribute value assigned to the financial transaction may be determined depending on where the financial transaction is located on the curve. In the case of the dynamic attribute 160A of transaction times (within transaction attributes 120A), the transaction times for all collected transactions may be plotted on a curve. The system may then consider where the particular hour and day of a particular financial transaction is on the curve to determine the attribute value for the particular transaction and the particular attribute (transaction attribute type 120A and dynamic attribute 160A). This may mean that times when the payment system experiences heavy usage (such as Christmas or Black Friday) could have a higher attribute value for this particular attribute. Fixed attributes 140 are generally stable and do not vary over short periods of time. In order to determine attribute values from financial transaction data 100 that has been segregated into fixed attributes 140, the attribute values may be computed by using a database with preassigned fixed attribute values based on the possible financial transaction data that may be segregated into each fixed attribute 140. For example, Mastercard provides several different card types (e.g., Gold, Platinum, Maestro, Cirrus, etc.). Each of these card types may have different attribute values assigned to them such that one of the attribute values determined for a particular financial transaction may be based on the type of card that was used in the transaction and the attribute value assigned to that card.

Once the financial transaction data 100 is segregated by attribute types 120 and fixed and dynamic attributes 140, 160, an attribute value is determined for each segregated attribute for each financial transaction. That is, an individual transaction may be segregated into each of the attribute types 120 (transaction 120A, merchant 120B, issuer 120C and user 120D) and into both the fixed and dynamic attributes 140, 160 within each type 120. An attribute value may then be determined for each of the attribute types 120 and the fixed and dynamic attributes 140, 160 therein for each financial transaction. Thus, each financial transaction may have a plurality of attribute values that can be determined for the financial transaction.

The plurality of attribute values for each of the financial transactions is then used to determine an interchange price 200 for each of the financial transactions. For example, a particular financial transaction may be segregated into 200 or more different attributes so that a corresponding number of attribute values can be determined for the financial transaction. Since most financial transactions will have one or more attribute values that are different from other financial transactions, the final interchange price 200 for a particular financial transaction will be tailored to that particular transaction when all of the attribute values for that transaction are combined to determine an interchange price 200.

Preferably, the interchange prices 200 are determined using a machine learning algorithm 180 that analyzes all of the attribute values of the financial transactions. For example, in the preferred embodiment, a gradient boosting regressor model 180 may be used to determine interchange prices 200 using all of the attribute values for all of the financial transactions that have been collected. Thus, the algorithm may consider the attribute values generated by all the fixed and dynamic attributes 140, 160 for each attribute type 120. The attribute values may then be used by the algorithm to arrive at the final interchange price 200, which may be a combination of a fixed price and a variable price, e.g., $0.30+1.69%. The interchange prices 200 are then paid by each merchant for their financial transactions which may be used by the other entities involved in processing financial transactions to cover the costs of the financial payment system.

It is understood that the described financial transaction processing method is intended to operate autonomously on programmed computer systems utilizing computer algorithms such that the system may be implemented by one or more computer processors (e.g., in a server system) executing computer-executable instructions stored on a non-transitory computer-readable storage medium. Thus, for example, the financial transaction data 100 may be collected and segregated into attributes 120, 140, 160, attribute values may be determined and a machine learning algorithm 180 may determine interchange prices 200 without the need for human beings to intervene in the steps of determining interchange prices 200. This autonomous design makes the processing system scalable to a level that would be impractical if human beings were to attempt to perform the steps required by the system. While it is understood that various human beings may provide inputs to the system and may adjust parameters that control how the system operates, the financial transaction processing system is intended to have the capability of processing many thousands of transactions in short periods of time which would be impossible to accomplish with human intervention in each step.

While preferred embodiments of the inventions have been described, it should be understood that the inventions are not so limited, and modifications may be made without departing from the inventions herein. While each embodiment described herein may refer only to certain features and may not specifically refer to every feature described with respect to other embodiments, it should be recognized that the features described herein are interchangeable unless described otherwise, even where no reference is made to a specific feature. It should also be understood that the advantages described above are not necessarily the only advantages of the inventions, and it is not necessarily expected that all of the described advantages will be achieved with every embodiment of the inventions. The scope of the inventions is defined by the appended claims, and all devices and methods that come within the meaning of the claims, either literally or by equivalence, are intended to be embraced therein.

The invention claimed is:

1. A method of processing financial transactions, comprising:

collecting financial transaction data from many financial transactions executed through a multi-party payment card network system, the many financial transactions being stored in a computer database;

segregating the financial transaction data into a plurality of attribute types;

segregating the financial transaction data into fixed attributes and dynamic attributes;

determining a plurality of attribute values for each of the many financial transactions, the plurality of attribute values for each of the many financial transactions comprising attribute type values determined using the financial data segregated into the plurality of attribute types, fixed attribute values determined using the financial data segregated into the fixed attributes, and dynamic attribute values determined using the financial data segregated into the dynamic attributes, wherein the dynamic attribute values are determined using the financial transaction data that is segregated into each dynamic attribute, the financial transaction data being ordered within each dynamic attribute and the dynamic attribute values being assigned based on an order of each financial transaction; and determining an interchange price for each of the many financial transactions using the plurality of attribute values determined for each of the many financial transactions, each of the interchange prices being stored in another computer database; and transmitting each of the interchange prices to one or more of a merchant, acquirer, card issuer or transaction processor.

2. The method of processing financial transactions according to claim 1, wherein the plurality of attribute types comprises transaction attributes.

3. The method of processing financial transactions according to claim 2, wherein the financial transaction data that is segregated into transaction attributes is further segregated into fixed attributes and dynamic attributes.

4. The method of processing financial transactions according to claim 1, wherein the plurality of attribute types comprises merchant attributes.

5. The method of processing financial transactions according to claim 4, wherein the financial transaction data that is segregated into merchant attributes is further segregated into fixed attributes and dynamic attributes.

6. The method of processing financial transactions according to claim 1, wherein the plurality of attribute types comprises issuer attributes.

7. The method of processing financial transactions according to claim 6, wherein the financial transaction data that is segregated into issuer attributes is further segregated into fixed attributes and dynamic attributes.

8. The method of processing financial transactions according to claim 1, wherein the plurality of attribute types comprises user attributes.

9. The method of processing financial transactions according to claim 8, wherein the financial transaction data that is segregated into user attributes is further segregated into fixed attributes and dynamic attributes.

10. The method of processing financial transactions according to claim 1, wherein the financial transaction data that is segregated into each of the plurality of attribute types is further segregated into fixed attributes and dynamic attributes associated with each of the plurality of attribute types.

11. The method of processing financial transactions according to claim 1, wherein the fixed attribute values are determined using a database with preassigned fixed attribute values based on possible financial transaction data segregated into each fixed attribute.

12. The method of processing financial transactions according to claim 1, wherein machine learning is used to determine the interchange price using the plurality of attribute values.

13. The method of processing financial transactions according to claim 12, wherein the machine learning comprises a gradient boosting regressor model.

14. The method of processing financial transactions according to claim 1, wherein the financial transaction data is collected over a period of time, and individual interchange prices are determined for each of the many financial transactions occurring during the period of time.

15. The method of processing financial transactions according to claim 1, wherein the computer database storing the many financial transactions and the another computer database storing the interchange prices consist of the same computer database.

16. The method of processing financial transactions according to claim 1, wherein each merchant associated with each of the many financial transactions pays the interchange price determined for each one of the respective financial transactions.

17. The method of processing financial transactions according to claim 16, wherein machine learning is used to determine the interchange price using the plurality of attribute values, the financial transaction data is collected over a period of time, and individual interchange prices are determined for each of the many financial transactions occurring during the period of time.

18. The method of processing financial transactions according to claim 17, wherein the financial transaction data that is segregated into each of the plurality of attribute types is further segregated into fixed attributes and dynamic attributes associated with each of the plurality of attribute types.

19. The method of processing financial transactions according to claim 18, wherein the fixed attribute values are determined using a database with preassigned fixed attribute values based on possible financial transaction data segregated into each fixed attribute, and the dynamic attribute values are determined using the financial transaction data that is segregated into each dynamic attribute, the financial transaction data being ordered within each dynamic attribute and the dynamic attribute values being assigned based on an order of each financial transaction.

* * * * *